Jan. 7, 1930.　　　　　G. P. CRONER　　　　　1,742,582
HYDRAULIC PISTON
Filed Feb. 11, 1929
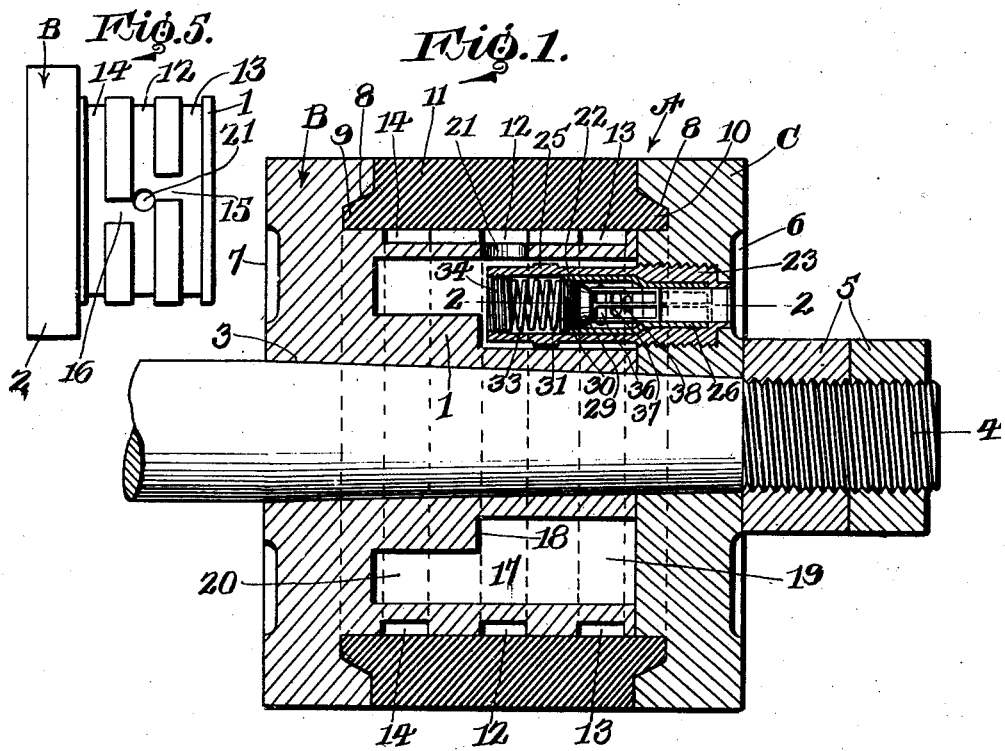
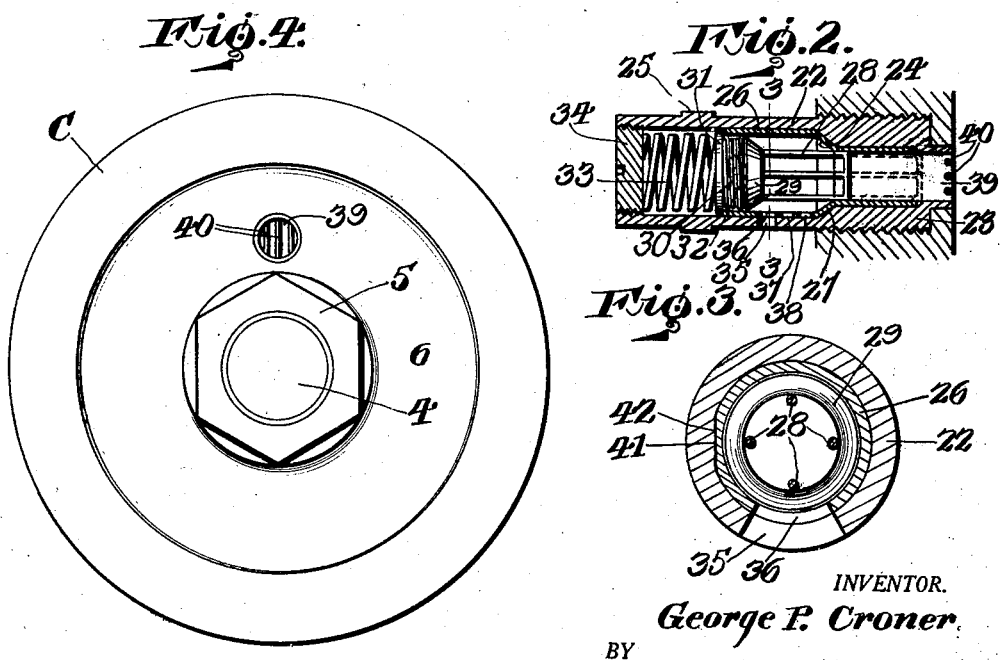
INVENTOR.
George P. Croner.
BY
Geo. P. Kimmel
ATTORNEY.

Patented Jan. 7, 1930

1,742,582

UNITED STATES PATENT OFFICE

GEORGE P. CRONER, OF FULLERTON, CALIFORNIA

HYDRAULIC PISTON

Application filed February 11, 1929. Serial No. 339,252.

This invention relates to a hydraulic piston particularly adapted for use in connection with automatic mud pumps for rotary drilling rigs.

The primary object of the invention is to provide, in a manner as hereinafter set forth, a piston of the class aforesaid wherein a liner is expanded by fluid pressure to firmly seat against the cylinder wall and whereby such fluid is controlled by an automatically operating valve, thereby maintaining an even pressure on the liner at varying pressures of the fluid.

With these and other objects in view, the invention consists of the novel construction, combination and arrangement of parts as hereinafter more particularly described, and as illustrated in the accompanying drawings wherein is shown a preferred embodiment of the invention, but it is to be understood that such drawings and description are to be taken as illustrative and that the invention is intended to be limited only by the scope of the claims hereunto appended.

In the accompanying drawings in which like numerals are employed to designate like parts throughout the same:—

Figure 1 is a vertical section through a piston constructed in accordance with this invention.

Figure 2 is a section taken on line 2—2 Figure 1.

Figure 3 is a section taken on line 3—3 of Figure 2.

Figure 4 is a view of the piston in end elevation.

Figure 5 is a fragmentary sectional plan thereof.

Referring to the drawings in detail, A represents a piston consisting of an inner section B and an outer section C. The inner section B consists of a substantially cylindrical body portion 1 having an annular flange 2 formed integrally at one end thereof. The outer section C is adapted to seat against the opposite end of the body portion 1 and the outer peripheral portion thereof forms a counterpart of the flange 2 when the sections are in assembled relation. Extending transversely through the sections B and C is a tapered bore 3 for the reception therethrough of a tapered piston rod 4. Threaded on the outer end of the rod 4 is a pair of lock nuts 5 by means of which the sections may be firmly drawn together.

The forward face of the section C is formed with an annular recess 6 disposed concentrically of the bore 3 and the rearward face of the section B is formed with a similar recess 7. Spaced from the peripheral edges thereof, the opposing faces of the flange 2 and outer section C are formed with opposing annular recesses 8 for the reception therein of a pair of outwardly directed flanges 9 and 10 formed on an annular liner 11. The liner 11 is preferably formed of rubber and is seated on the body portion 1 between the opposing faces of the flange 2 and outer section C. Formed in the periphery of the body portion 1, centrally thereof, is a circumferentially extending groove 12, and on opposite sides of the groove 12 are similar grooves respectively indicated at 13 and 14. Communication is established between the grooves 12 and 13 by means of a passageway 15 and between the grooves 12 and 14 by means of a similar passageway 16. The passageways 15 and 16 are offset with respect to each other.

Formed within the body portion 1 is an annular chamber 17 which is disposed concentrically of the bore 3 in spaced relation thereto. The inner wall of the chamber 17 is offset, as indicated at 18, whereby the chamber 17 is formed with a forward end portion 19 of greater depth than the rearward end portion 20. The outer wall of the chamber 17 has an opening 21 extending therethrough, by means of which communication is established between the interiors of the chamber 17 and groove 12.

Extending longitudinally of the piston and disposed within the forward end portion 19 of the chamber 17 is a hollow plug 22, which is formed with an externally threaded, thickened end portion 23 which is threaded into the outer section C of the piston. The forward end portion of the plug 22 is of less diameter than the rearward end portion thereof and adjacent the thickened portion 23, the plug 22 is formed with an internal, beveled shoulder 24. Spaced from the rearward end thereof, the plug 22 is provided with a hexagonal exterior surface 25 in order that a suitable tool may be supplied thereto for threading the plug into the outer section C of the piston.

Slidably mounted within the plug 22 is a tubular member 26, which is formed intermediate its ends with a beveled shoulder 27 for seating against the beveled shoulder 24 of the plug 22. Slidably mounted within the forward end of the member 26 is a guide 28 of skeleton construction, which has secured to its rearward end a valve 29. The valve 29 is formed with a tapered forward face for seating against the inner face of the shoulder 27 when the guide 28 is moved forwardly with respect to the member 26. Threaded in the rearward end of the member 26 is a cap 30, which is formed at its rearward end with a flange 31 bearing against the rearward end of the member 26.

A knob 32 is provided on the rearward face of the valve 29 for maintaining the latter in spaced relation to the spring 30 to prevent sticking of the valve. The member 26 is normally maintained with the shoulder 27 seated against the shoulder 24 of the plug 22 by means of a spring 33, one end of which abuts against a cap 34 threaded in the rearward end of the plug 22, and the other end of which abuts against the cap 31. The tension of the spring 33 may be varied as desired by manipulation of the cap 34. Communication is established between the interiors of the chamber 17 and plug 22 by means of an opening 35 formed through the wall of the plug. The wall of the member 26 is formed with a plurality of spaced ports 36, 37 and 38, which are adapted to be selectively registered with the opening 35. The port 36 is materially larger than the port 37 and the latter is materially larger than the port 38. With any one of the ports 36, 37 and 38 in registry with the opening 35, communication is established between the interiors of the chamber 17 and tubular member 26.

Extending through the bottom wall of the annular recess 6 is a circular opening 39 by means of which an inlet is provided to the interior of the member 26. Spanning the mouth of the opening 39 is a card 40 which provides a screen for the opening. Relative rotary movement is prevented between the tubular members 26 and plug 22 by means of a longitudinally extending, flat portion 41 formed on the exterior surface of the member 26 which engages a similar flat portion 42 formed on the inner surface of the plug 22.

When the piston A is actuated in a forward direction within a cylinder, any fluid within the cylinder is forced under pressure through the openings 39 against the valve 29, which forces the latter in a rearward direction until the port 36 is brought into registry with the opening 35 as illustrated in Figure 2. With the port 36 and opening 35 thus in registry, the fluid may pass into the chamber 17 and through the openings 21 into the grooves 12, thence through the passageways 15 and 16 to the grooves 13 and 14. The pressure is thus transmitted to the inner surface of the liner 11 which forces the outer surface of the latter against the inner wall of the cylinder within which the piston is operating and thereby provides a seal between the piston and inner wall of the cylinder.

When the pressure of the fluid increases to a predetermined point, the spring 33 is compressed which permits the member 26 to be moved in a rearward direction with respect to the plug 22. Upon movement of the member 26 with respect to the plug 22, the port 36 is brought out of registry with the opening 35 and the port 37 is brought into registry therewith. Due to the lesser area of the port 37, the pressure of the fluid against the liner 11 is the same when the fluid is passed through the port 37 and opening 35 as when it is passed through the port 36 and opening 35. Upon a further increase of pressure of the fluid entering through the openings 39, the spring 33 is further compressed and the port 37 is brought out of registry with the opening 35 and the port 38 brought into registry therewith. Due to the decrease in area of the port 38 over that of the port 37, the pressure against the inner surface of the liner 9 remains unchanged. Upon the return stroke of the piston A, the valve 29 is drawn by suction into engagement with the shoulder 27 whereby the inlet to the member 26 is closed.

It is thought that the many advantages of a piston in accordance with this invention will be readily apparent, and although the preferred embodiment is as illustrated and described, yet it is to be understood that changes may be made in the details of construction, which fall within the scope of the invention as defined in the appended claims.

What I claim is:

1. In a device of the character described, a piston formed with a peripherally extending recess and a concentrically arranged, annular chamber, the bottom wall of said recess having a groove in communication with said chamber, a hollow plug within the chamber and anchored at one end to the piston, the wall of said plug having an opening into said chamber, a tubular member slidably mounted within the plug and formed with a plurality of spaced ports for progressive registration with said opening, means to provide an inlet to the interior of the tubular member from the exterior of the piston, and a pressure operated valve for said inlet.

2. In a device of the character described, a piston formed with a peripherally extending recess and a concentrically arranged, annular chamber, the bottom wall of said recess having a groove in communication with said chamber, a hollow plug within the chamber and anchored at one end to the piston, the wall of said plug having an opening into said chamber, a tubular member slidably mounted within the plug and formed with a plurality of spaced ports for progressive registration with said opening, means to provide an inlet to the interior of the tubular member from the exterior of the piston, and a pressure operated valve for said inlet, the bottom wall of said recess further having a pair of spaced grooves in communication with said first named groove.

3. In a device of the character described, a piston formed with a peripherally extending recess and a concentrically arranged, annular chamber, the bottom wall of said recess having a groove in communication with said chamber, a hollow plug within the chamber and anchored at one end to the piston, the wall of said plug having an opening into said chamber, a tubular member slidably mounted within the plug and formed with a plurality of spaced ports for progressive registration with said opening, means to provide an inlet to the interior of the tubular member from the exterior of the piston, a liner seated within said recess, and a pressure operated valve for said inlet.

4. A piston formed of an inner section and an outer section, said inner section including a cylindrical body portion having a flange formed integrally at one end, said outer section seating against the opposite end of said body portion, said body portion formed with a concentrically arranged, annular chamber and further formed with a groove in communication with said chamber, a hollow plug within the chamber and anchored at one end to the piston, the wall of said plug having an opening into said chamber, a tubular member slidably mounted within the plug and formed with a plurality of spaced ports for progressive registration with said opening, means to provide an inlet to the interior of the tubular member from the exterior of the piston, and a pressure operated valve for said inlet.

5. In a device of the character described, a piston formed with a peripherally extending recess and a concentrically arranged, annular chamber, the bottom wall of said recess having a groove in communication with said chamber, a hollow plug within the chamber and anchored at one end to the piston, the wall of said plug having an opening into said chamber, a tubular member slidably mounted within the plug and formed with a plurality of spaced ports for progressive registration with said opening, means to provide an inlet to the interior of the tubular member from the exterior of the piston, and a pressure operated valve for said inlet, said ports having graduating areas with respect to each other.

6. In a device of the character described, a piston formed with a peripherally extending recess and a concentrically arranged, annular chamber, the bottom wall of said recess having a groove in communication with said chamber, a hollow plug within the chamber and anchored at one end to the piston, the wall of said plug having an opening into said chamber, a tubular member slidably mounted within the plug and formed with ports of graduating areas, one of said ports normally registering with said opening, means to provide an inlet to the interior of the tubular member from the exterior of the piston, a valve for controlling said inlet, and means whereby a pressure on said valve actuates said tubular member to progressively register said ports with said opening.

In testimony whereof, I affix my signature hereto.

GEORGE P. CRONER.